United States Patent [19]

Shihabi

[11] 4,430,200

[45] Feb. 7, 1984

[54] HYDROCARBON CONVERSION PROCESS

[75] Inventor: David S. Shihabi, Pennington, N.J.

[73] Assignee: Mobil Oil Corporation, New York, N.Y.

[21] Appl. No.: 406,416

[22] Filed: Aug. 9, 1982

[51] Int. Cl.³ .................. C10G 11/05; C10G 97/20
[52] U.S. Cl. ................................. 208/120; 208/111; 502/60
[58] Field of Search ............. 208/111; 252/455 Z; 208/120

[56] References Cited

U.S. PATENT DOCUMENTS

| | | | |
|---|---|---|---|
| 3,748,251 | 7/1973 | Demmel et al. | 208/120 |
| 3,937,791 | 2/1976 | Garwood et al. | 252/455 Z |
| 3,939,058 | 2/1976 | Plank et al. | 252/455 Z |
| 4,036,739 | 7/1977 | Ward | 252/455 Z |
| 4,284,529 | 8/1981 | Shihabi | 208/111 |
| 4,315,814 | 2/1982 | Shihabi | 208/120 |

*Primary Examiner*—Delbert E. Gantz
*Assistant Examiner*—Anthony McFarlane
*Attorney, Agent, or Firm*—Alexander J. McKillop; Michael G. Gilman; Richard D. Stone

[57] ABSTRACT

Hydrocarbon conversion catalysts having reduced aging rates and exhibiting lower gas yield in conversion processes are made by pre-steaming a large pore, high silica zeolite such as mordenite or zeolite Y and base-exchanging the steamed zeolite with an alkali metal to reduce the acidity to a low value.

20 Claims, No Drawings

HYDROCARBON CONVERSION PROCESS

FIELD OF THE INVENTION

The present invention relates to hydrocarbon conversion processes such as cracking and hydrocracking and, more particularly, to conversion processes employing large pore zeolites.

THE PRIOR ART

Cracking and hydrocracking processes are well known in the refining of petroleum and catalysts for these processes are well known. Cracking catalysts generally consist of a porous solid having the acidic functionality which is necessary to induce the desired cracking reactions. The solid may be an amorphous material such as alumina or silica-alumina although, in recent years, acidic zeolites have become more widely used because of their desirable properties. The zeolites generally used for this purpose have been the large pore zeolites such as faujasite, mordenite and the synthetic zeolites X and Y which are members of the faujasite family. Hydrocracking employs a porous acidic catalyst similar to that used in cracking but has a hydrogenation component associated with it. This hydrogenation component may be a noble metal such as platinum or palladium or a non-noble metal or combination of metals; hydrogenation components base on non-noble metals of Groups VIA and VIIIA of the Periodic Table (the Periodic Table used in this specification is the chart approved by IUPAC and the U.S. National Bureau of Standards and shown, for example, in the table of Fisher Scientific Company, Catalog No. 5-702-10) have enjoyed widespread use. The acidic functionality in the hydrocracking catalyst may be provided by an amorphous material such as silica-alumina or a crystalline zeolite, especially the large pore zeolites mentioned above.

Because the cracking activity of the zeolite catalysts is related to their acidic functionality, the more highly active zeolites have generally been characterized by a very low content of alkali metal which would otherwise reduce the degree of acidity. Because many synthetic zeolites such as zeolite X and Y contain significant quantities of alkali metal cations in their as-synthesized state, it has generally been thought necessary to carry out extensive ion-exchange in order to reduce the alkali metal content of these zeolites to acceptable levels. On the other hand, U.S. Patent Re. 26,188 shows that cracking activity may be maintained when but one third of the sodium has been removed by base exchange.

Zeolite ZSM-5 has been described as having utility in conversion processes such as cracking or hydrocracking in U.S. Pat. No. 3,702,886. Its utility in catalytic dewaxing processes is described in U.S. Pat. Nos. 3,140,322, Re. 28,398 and 3,956,102.

Hydrocracking processes using hydrogen form zeolite Y as the acidic component are described, for example, in U.S. Pat. Nos. 3,269,934 and 3,524,809. Zeolite ZSM-20 which resembles faujasite in certain aspects of structure, but which has a higher silica:alumina ratio usually within the range from 7:1 to 10:1, has also been proposed for use as the acidic component of a hydrocracking catalyst in U.S. Pat. No. 4,021,331 and European Patent No. 14,291. The silica:alumina ratios of these catalysts has remained, however, at a relatively low value, not higher than about 7:1 or 8:1. U.S. Pat. No. 3,923,641 describes a process for hydrocracking naphthas using zeolite beta as the acidic component of the catalyst. In some processes which have been proposed, the zeolite is used together with an amorphous material, as described in U.S. Pat. No. 3,523,887.

SUMMARY OF THE INVENTION

It has now been found that hydrocarbon conversion processes such as cracking and hydrocracking may be carried out with low acidity, high silica zeolites which have been steamed to reduce their acidic activity to a low level and then base-exchanged with an alkali metal to reduce their acidity still further. These catalysts have extended cycle life and also tend to reduce the amount of gas ($C_{4-}$) produced during the conversion reaction.

DESCRIPTION OF PREFERRED EMBODIMENTS

The zeolites which may be used in the present conversion processes are large pore crystalline zeolites having a silica:alumina ratio greater than 12:1. Many crystalline zeolites are known. Some occur (at least so far) only in nature, for instance paulingite and merlinoite: some occur only as a result of synthesis, for instance zeolites A and ZSM-5: and some occur in both natural and synthetic forms, for instance mordenite, a synthetic counterpart of which is known as Zeolon, and faujasite, synthetic counterparts of which are known as zeolites X and Y. Counterparts are of course demonstrated as such by correspondence of their X-ray diffraction data, the indicia by means of which the individuality of a zeolite is established. Such data are a manifestation of the particular geometry of the three-dimensional lattice, formed of $SiO_4$ and $AlO_4$ tetrahedra cross-linked by the sharing of oxygen atoms and including sufficient cationic complement to balance the resulting negative charge on the $AlO_4$ tetrahedra, of which a zeolite consists.

The chemical formula of a zeolite is thus

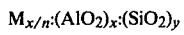
$$M_{x/n}:(AlO_2)_x:(SiO_2)_y$$

where M is a cation of valence n and x and y are the number of aluminum and silicon atoms, respectively, in the unit cell. This expression is however frequently transmuted into the mole ratio of oxides form.

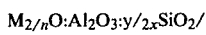
$$M_{2/n}O:Al_2O_3:y/2x SiO_2/$$

which is of course empirically ascertainable and thus the only formula which can be ascribed to a zeolite when its unit cell contents are unknown. Since the only significant quantity in such a formula is the term y/2x, and since this term (which is almost invariably a range) can usually be satisfied by many zeolites of widely differing lattice geometry, chemical formula is not of value in establishing the identity of a zeolite. Furthermore, such a formula frequently expresses artefact when empirically derived, the cationic-valence-/aluminum-atoms ratio deviating from the unity which it must in fact be: and it fails to provide for zeolites whose lattice structure can be brought into existence from reaction mixtures from which alumina is excluded.

The zeolites which are used in the present process are characterized by a porous lattice structure which possesses pores having a minimum dimension of at least 6 Angstroms. In addition, the zeolite is to have a structural silica:alumina ratio of 12:1 or more, preferably much higher e.g. 20:1, 50:1, 100:1, 200:1 or 500:1. Zeolites of this type may also be characterized in terms of their Constraint Index.

Zeolites have a crystal structure which is capable of regulating the access to an egress from the intracrystalline free space. This control, which is effected by the crystal structure itself, is dependent both upon the molecular configuration of the material which is or, alternatively, is not, to have access to the internal structure of the zeolite and also upon the structure of the zeolite itself. The pores of the zeolite are in the form of rings which are formed by the regular disposition of the tetrahedra making up the anionic framework of the crystalline aluminosilicate, the oxygen atoms themselves being bonded to the silicon or aluminum atoms at the centers of the tetrahedra. A convenient measure of the extent to which a zeolite provides this control for molecules of varying sizes to its internal structure is provided by the Constraint Index of the zeolite: zeolites which provide but highly restricted access to and egress from the internal structure have a high value for the Constraint Index and zeolites of this kind usually have pores of small size. Contrariwise, zeolites which provide relatively free access to the internal zeolite structure have a low value for the Constraint Index. The method by which Constraint Index is determined is described fully in U.S. Pat. No. 4,016,218 to which reference is made for details of the method together with examples of Constraint Index for some typical zeolites. Because Constraint Index is related to the crystalline structure of the zeolite but is nevertheless determined by means of a test which exploits the capacity of the zeolite to engage in a cracking reaction, that is, a reaction dependent upon the possession of acidic sites and functionality in the zeolite, the sample of zeolite used in the test should be representative of zeolitic structure whose Constraint Index is to be determined and should also possess requisite acidic functionality for the test. Acidic functionality may, of course, be varied by artifices including base exchange, steaming or control of silica:alumina ratio.

Consistent with the pore size limitation mentioned above the zeolites used in the present process will generally have a Constraint Index below 1. Zeolites of this kind which may also be produced with the requisite silica:alumina ratios include mordenite, zeolite Y, zeolite ZSM-20 and zeolite beta.

If the zeolite selected may be produced in the desired highly siliceous form by direct synthesis, this will often be the most convenient method for obtaining it. Zeolite beta, for example, is known to be capable of being synthesized directly in forms having silica:alumina ratios up to 100:1, as described in U.S. Pat. Nos. 3,308,069 and Re 28,341 which describe zeolite beta, its preparation and properties in detail. Reference is made to these patents for these details. Zeolite Y, on the other hand, can be synthesized only in forms which have silica:alumina ratios up to about 5:1 and in order to achieve higher ratios, resort may be made to various techniques to remove structural aluminum so as to obtain a more highly siliceous zeolite. The same is true of mordenite which, in its natural or directly synthesized form has a silica:alumina ratio of about 10:1. Zeolite ZSM-20 may be directly synthesized with silica:alumina ratios of 7:1 or higher, typically in the range of 7:1 to 10:1, as described in U.S. Pat. Nos. 3,972,983 and 4,021,331 to which reference is made for details of this zeolite, its preparation and properties. Zeolite ZSM-20 also may be treated by various methods to increase its silica:alumina ratio.

Control of the silica:alumina ratio of the zeolite in its as-synthesized form may be exercised by an appropriate selection of the relative proportions of the starting materials, especially the silica and alumina precursors, a relatively smaller quantity of the alumina precursor resulting in a higher silica:alumina ratio in the product zeolite, up to the limit of the synthetic procedure. If higher ratios are desired and alternative syntheses affording the desired high silica:alumina ratios are not available, other techniques such as those described below may be used in order to prepare the desired highly siliceous zeolites.

The silica:alumina ratios referred to in this specification are the structural or framework ratios, that is, the ratio for the $SiO_4$ to the $AlO_4$ tetrahedra which together constitute the structure of which the zeolite is composed. This ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain treatments such as the dealuminization methods described below which result in the presence of ionic aluminum free of the zeolite structure are employed. Due care should therefore be taken to ensure that the framework silica:alumina ratio is correctly determined.

A number of different methods are known for increasing the structural silica:alumina ratio of various zeolites. Many of these methods rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the method: Catalysis by Zeolites (International Symposium on Zeolites, Lyon, Sept. 9-11, 1980), Elsevier Scientific Publishing Co., Amsterdam, 1980 (dealuminization of zeolite Y with silicon tetrachloride); U.S. Pat. No. 3,442,795 and G.B. No. 1,058,188 (hydrolysis and removal of aluminum by chelation); G.B. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-contrary gases at high temperatures), NL 7,604,264 (acid extraction), JA 53,101,003 (treatment with EDTA or other materials to remove aluminum) and J. Catalysis 54 295

(1978) (hydrothermal treatment followed by acid extraction).

Because of their convenience and practicality the preferred dealuminization methods for preparing the present highly siliceous zeolites are those which rely upon acid extraction of the aluminum from the zeolite. It has been found that zeolite beta may be readily dealuminized by acid extraction. Briefly, the method comprises contacting the zeolite with an acid, preferably a mineral acid such as hydrochloric acid. The dealuminization proceeds readily at ambient and mildly elevated temperatures and occurs with minimal losses in crystallinity, to form high silica forms of zeolite beta with silica:alumina ratios of at least 100:1, with ratios of 200:1 or even higher being readily attainable.

The zeolite is conveniently used in the hydrogen form for the dealuminization process although other cationic forms may also be employed, for example, the sodium form. If these other forms are used, sufficient acid should be employed to allow for the replacement by protons of the original cations in the zeolite. The zeolite should be used in a convenient particle size for mixing with the acid to form a slurry of the two components. The amount of zeolite in the slurry should generally be from 5 to 60 percent by weight.

The acid may be a mineral acid i.e., an inorganic acid or an organic acid. Typical inorganic acids which can be employed include mineral acids such as hydrochloric, sulfuric, nitric and phosphoric acids, peroxydisulfonic acid, dithionic acid, sulfamic acid, peroxymonosulfuric acid, amidosulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture at an undesirably low level which could affect the crystallinity of the zeolite undergoing treatment. The acidity which the zeolite can tolerate will depend, at least in part, upon the silica:alumina ratio of the starting material. Generally, it has been found that zeolite beta can withstand concentrated acid without undue loss in crystallinity but as a general guide, the acid will be from 0.1 N to 4.0 N, usually 1 to 2 N. These values hold good regardless of the silica:alumina ratio fo the zeolite beta starting material. Stronger acids tend to effect a relatively greater degree of aluminum removal than weaker acids.

Higher silica:alumina ratios in the product may be obtained with starting materials of relatively lower silica:alumina ratio e.g., below 30:1.

The dealuminization reaction proceeds readily at ambient temperatures but mildly elevated temperatures may be employed e.g. up to 100° C. The duration of the extraction will affect the silica:alumina ratio of the product since extraction, being diffusion controlled, is time dependent. However, because the zeolite becomes progressively more resistant to loss of crystallinity as the silica:alumina ratio increases i.e. it becomes more stable as the aluminum is removed, higher temperatures and more concentrated acids may be used towards the end of the treatment than at the beginning without the attendant risk of losing crystallinity.

After the extraction treatment, the product is water washed free of impurities, preferably with distilled water, until the effluent wash water has a pH within the approximate range of 5 to 8.

Catalytic materials for particular uses can be prepared by replacing the cations as required with other metallic or ammoniacal ions. If calcination is carried out prior to ion exchange, some or all of the resulting hydrogen ions can be replaced by metal ions in the ion exchange process. The silica:alumina ratio will be at least 100:1 and preferably at least 150:1. Ratios of 200:1 or higher e.g. 250:1, 300:1, 400:1 or 500:1 may be obtained by use of this procedure. If desired, the zeolite may be steamed prior to acid extraction so as to increase the silica:alumina ratio and render the zeolite more stable to the acid. The steaming may also serve to increase the ease with which the acid is removed and to promote the retention of crystallinity during the extraction procedure.

Highly siliceous forms of zeolite Y may be readily prepared by acid extraction of structural aluminum but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size reduction of the alkali metal ions and the unit cell size reduction. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite. The acid extraction may be made in the same way as described above for zeolite beta.

Other methods for increasing the silica:alumina ratio of zeolite Y by acid extraction are described in U.S. Pat. Nos. 4,218,307, 3,591,488 and 3,691,099, to which reference is made for details of these methods.

Zeolite ZSM-20 may be converted to more highly siliceous forms by a process similar to that used for zeolite Y: first, the zeolite is converted to an "ultrastable" form which is then dealuminized by acid extraction. The conversion to the ultrastable form may suitably be carried out by the same sequence of steps used for preparing ultrastable Y. The zeolite is successively base-exchanged to the ammonium form and calcined, normally at temperatures above 700° C. The calcination should be carried out in a deep bed in order to impede removal of gaseous products, as recommended in Advances in Chemistry Series, No. 121, op cit. Acid extraction of the "ultrastable" ZSM-20 may be effected in the same way as described above for zeolite beta.

Highly siliceous forms of mordenite may be made by acid extraction procedures of the kind described, for example, in U.S. Pat. Nos. 3,691,099, 3,591,488 and other dealuminization techniques which may be used for mordenite are disclosed, for example, in U.S. Pat. Nos. 4,273,753, 3,493,519 and 3,442,795. Reference is made to these patents for a full description of these processes.

The highly siliceous zeolite is steamed until the cracking activity, as measured by the alpha value, is at least 10. A method of determining alpha is described in U.S. Pat. No. 4,016,218 and J. Catalysis VI, 278–287 (1966), to which reference is made for details of the method. Since the acidity of the zeolite is dependent in part upon the silica:alumina ratio, the zeolites with higher silica:alumina ratios having a lower intrinsic acidity, the degree of steaming necessary to reduce alpha to the desired value will, in turn, be dependent upon the silica:alumina ratio of the zeolite according to an inverse relationship: with higher silica:alumina ratios less steaming will be required.

The steaming is generally carried out at temperatures above 200° C. and more commonly in the range fo 200° to 900° C., for a period of time typically ranging from 2 to 48 hours, more usually 2 to 24 hours. The atmosphere may be comprised wholly or partly of water vapor but if atmospheres of less than 100 percent v/v water vapor are used, the other gas should be inert e.g. nitrogen. Steaming will be continued until the requisite alpha value is reached, as determined by individual testing or by reference to previous experimentation.

During the steaming the zeolite should be in the hydrogen or ammonium form in order to permit dehydroxylation to take place; other cations such as sodium and other alkali metals will protect the aluminum in the zeolite framework by inhibiting dehydroxylation and therefore will not permit the desired effect of the steaming step to be achieved. If the zeolite is in a form other than the hydrogen or ammonium form, it may be converted to the desired form by conventional methods such as base exchange with a solution of ammonium ions or contact with ammonia gas to yield the ammonium form of the zeolite which may then be calcined in air or an inert gas such as nitrogen to give the hydrogen form.

The steamed zeolite is then base exchanged to reduce the acidity still further, to an alpha value of less than 5 and preferably less than 0.5. The base exchange is carried out in a conventional manner with a solution of alkali metal cations e.g. sodium, potassium or cesium, of which sodium is preferred. Exchange may be carried out in a single step or a number of sequential steps until the requisitely low alpha value is attained. As a preliminary to the alkali metal exchange, the steamed zeolite may be treated with a solution of an ammonium salt, preferably ammonium nitrate. It has been found that this treatment works a favorable effect upon the steamed zeolite by a mechanism which is not fully understood; it is possible that aluminum is removed but even this is uncertain since the effect of the treatment is to increase the acidity of the zeolite to a certain degree.

The treated zeolite may be incorporated in a matrix in order to confer satisfactory mechanical properties such as physical strength and abrasion resistance. Suitable matrix materials include porous oxides such as silica, alumina or silica-alumina and clays, as described in U.S. Pat. No. 4,016,218, to which reference is made for further details of suitable matrix materials. The zeolite may also be dried prior to use in air or an inert atmosphere such as nitrogen. Suitable drying temperatures are typically from 300° C. to 599° C., preferably 400° C. to 500° C.

The zeolites may be used in hydrocarbon conversion processes such as cracking and hydrocracking. It is surprising that these catalysts, being of low acidity, are capable of effecting a bulk conversion of the feedstock while, at the same time, exhibiting a reduced rate of aging and significantly lowering the proportion of $C_4-$ gas produced in the process.

The catalysts produced by the present process may be used in combination with other catalysts and a particularly preferred combination is with the pre-steamed, low acidity ZSM-5 type catalysts in the alkali metal forms, e.g., NaZSM-5. Catalysts of this type are described in U.S. Pat. No. 4,263,129, to which reference is made for details of those ZSM-5 type catalysts. The thermal and hydrothermal stabilities of the two zeolite component will be comparable to one another and therefore a stable catalyst composition will be obtained.

If the catalyst is used as a hydrocracking catalyst it will incorporate a hydrogenation component such as a noble metal of Group VIIIA such as platinum or palladium or a base metal of Group VIA or VIIIA. Base metals such as nickel, cobalt, molybdenum and tungsten have been shown to be very effective, especially in combinations such as cobalt-molybdenum, nickel-tungsten and nickel-tungsten-titanium. The base metals may be pre-sulfided to convert their oxide forms to sulfides by exposure to a sulphurizing gas such as hydrogen sulfide in the conventional way. The metal component may be incorporated into the catalyst by ion exchange or impregnation, as is conventional, for example, using solutions of complex cations such as $Pt(NH_3)_4^{2+}$ or $Ni(NH_3)_6^{2+}$ or complex anions such as tungstate or vanadate, as is conventional. The amount of the hydrogenation component is typically from 1 to 10 percent by weight of the catalyst, with more usually being required of the base metal components.

The conversion reaction may be carried out under conditions which are in themselves conventional. For example, cracking may be carried out in a fluidized bed (FCC) reactor or a moving bed (TCC) reactor at temperatures of 450° C. to 650° C., more usually 500° C. to 600° C. Hydrocracking will normally be carried out at temperatures up to 450° C. at high pressures over 7000 kPa in the presence of hydrogen (usually 300 to 600 n.l.l$^{-1}$ of hydrocarbon charge) in a trickle bed reactor. Feedstocks may range from naphthas through distillates to heavy oil fractions such as gas oils but normally the feedstock will be a high boiling fraction with an initial boiling point of 345° C. (about 650° F.) and a typical boiling range of 345° C. to 540° C. (about 650° F. to 1000° F.). Oils of this kind include reduced crudes, both atmospheric and vacuum, heavy gas oils, deasphalted residua, catalytic cracking lower bottoms, coker tower bottoms, hydrocracker effluents and oils derived from tar sands, shale and coal. Other feedstocks include light gas oils, kerosene and jet fuel stocks.

The invention is illustrated by the following Examples in which all proportions and percentages are by weight unless the contrary is stated.

EXAMPLE 1

Mordenite in the hydrogen form having a silica:alumina ratio of 10:1 (structural ratio, determined by TGA/$NH_3$ desorption) was extracted with 0.5 N HCl at 100° C. for under reflux 16 hours. The resulting mordenite, having a structural silica:alumina ratio of 85:1 was contracted with 1 N $NH_4HO_3$ solution at room temperature to give the ammoniated form of the zeolite. The $NH_4$-mordenite so prepared was contacted with 100 percent steam at 450° C. for 15 hours. The steamed product had an initial alpha value of 800 declining to 654 after 45 minutes. The steamed product was then sodium exchanged to alpha less than 0.5 using a solution of 0.25 N $NaHCO_3$.

EXAMPLES 2-4

The pre-steamed low acidity catalyst of Example 1 was used without the addition of binder for hydrocracking an Arab Light Heavy Gas Oil (boiling range: 425° C.-575° C.) at temperatures of 410° C.-415° C. at 0.6 hr$^{-1}$ LHSV. The conversion and product distributions are shown below in the Table, together with comparable data obtained with a steamed, NaZSM-5 extruded catalyst (Example 3) and an unsteamed NaZSM-5, binder-free catalyst (Example 4).

| Example No. | 2 | 3 | 4 |
|---|---|---|---|
| Catalyst | Pre-steamed Na-Mordenite (binder free) | Pre-steamed NaZSM-5 Extrudate | Un-steamed Na-ZSM-5 (binder free) |
| Time on stream, Days | 9 | 10 | 6 |
| Temperature, °C. | 415 | 410 | 410 |
| LHSV, hr$^{-1}$ | 0.56 | 0.48 | 0.5 |
| Conversion, percent | 46 | 40 | 35 |
| Product, wt % | | | |
| $C_4$- | 3 | 10.4 | 4.3 |
| $C_5$ 215° C. | 10.6 | 11.8 | 9 |
| 215° C.-425° C. | 32.8 | 17.5 | 21.6 |
| Selectivity | | | |
| $C_4$- | 7 | 26 | 12.2 |
| $C_5$-215° C. | 13 | 30 | 26.1 |
| 215° C.-425° C. | 71 | 44 | 61.6 |

The results above show that the pre-steamed, dealuminized, low-acidity mordenite is a good boiling point conversion catalyst which has a lower selectivity for gas production than unsteamed and pre-steamed ZSM-5 type catalysts.

I claim:

1. A method for making a hydrocarbon conversion catalyst, which comprises steaming a large pore, crystalline aluminosilicate zeolite having a silica:alumina ratio of at least 12:1 and a Constraint Index of less than 1 until the zeolite has a reduced alpha value and base exchanging the steamed zeolite with an alkali metal to reduce the acidity to an alpha value of less than 5.

2. A method according to claim 1 in which the zeolite has a pore size of at least 6 A.

3. A method according to claim 1 in which the zeolite is mordenite.

4. A method according to claim 1 in which the alpha value of the alkali-metal exchanged zeolite is less than 1.

5. A method according to claim 1 in which the alpha value of the alkali-metal exchanged zeolite is less than 0.5.

6. A method according to claim 1 in which the alkali metal is sodium.

7. A method according to claim 1 in which the steamed zeolite is contacted with a solution of ammonium cations prior to the base exchange with the alkali metal.

8. A method according to claim 7 in which the steamed zeolite is contacted with an aqueous ammonium nitrate sodium prior to the base exchange with the alkali metal.

9. A method according to claim 1 in which the zeolite is steamed at a temperature of 200° C. to 900° C.

10. A hydrocarbon cracking process in which a hydrocarbon feedstock is contacted under cracking conditions of elevated temperature and pressure with a catalyst made by the steps of steaming a large pore, crystalline aluminosilicate zeolite having a silica:alumina ratio of at least 12 to 1 and a Constraint Index of less than 1 to reduce the alpha value and base exchanging the steamed zeolite with an alkali metal to reduce the acidity to an alpha value of less than 5.

11. A hydrocarbon cracking process according to claim 10 in which the zeolite has a pore size of at least 6 A.

12. A hydrocarbon cracking process according to claim 10 in which the zeolite is mordenite.

13. A hydrocarbon cracking process according to claim 10 in which the alpha value of the alkali metal exchanged zeolite is less than 1.

14. A hydrocarbon cracking process according to claim 10 in which the alpha value of the alkali-metal exchanged zeolite is less than 0.5.

15. A hydrocarbon cracking process according to claim 10 in which the alkali metal is sodium.

16. A hydrocarbon cracking process according to claim 10 in which the steamed zeolite is contacted with a solution of ammonium cations prior to the base exchange with the alkali metal.

17. A hydrocarbon cracking process according to claim 10 in which the steamed zeolite is contacted with an aqueous ammonium nitrate solution prior to the base exchange with the alkali metal.

18. A hydrocarbon cracking process according to claim 10 in which the zeolite is steamed at a temperature of 200° C. to 900° C.

19. A hydrocarbon cracking process according to claim 10 carried out in a fluidized bed reactor at a temperature of 450° to 650° C.

20. A process according to claim 10 wherein said catalyst comprises an acid extracted mordenite having a silica:alumina ratio of 85 to 1, in the $NH_4$ form and is contacted with 100 percent steam at 450° C. for 15 hours to reduce its alpha activity, and then subjected to sodium exchange using a solution of $NaHCO_3$ to produce a mordenite catalyst having an alpha activity less than 0.5.

* * * * *

UNITED STATES PATENT AND TRADEMARK OFFICE
CERTIFICATE OF CORRECTION

PATENT NO. : 4,430,200

DATED : February 7, 1984

INVENTOR(S) : David S. Shihabi

It is certified that error appears in the above—identified patent and that said Letters Patent is hereby corrected as shown below:

Col. 1, Line 28, "base" should read -- based --.

Col. 7, Line 10, "op cit" should be italicized or underscored.

Col. 8, Line 32, "component" should be plural.

Col. 10, Line 18, "sodium" should read -- solution --.

Signed and Sealed this

Twenty-seventh Day of November 1984

[SEAL]

Attest:

GERALD J. MOSSINGHOFF

Attesting Officer

Commissioner of Patents and Trademarks